United States Patent Office 3,113,963
Patented Dec. 10, 1963

3,113,963
ESTERS OF OXYDICARBOXYLIC ACIDS AND CYCLIC ALCOHOLS
John R. Caldwell and Winston J. Jackson, Jr., Kingsport, Tenn., assignors to Eastman Kodak Company, Rochester, N.Y., a corporation of New Jersey
No Drawing. Filed Jan. 16, 1962, Ser. No. 166,703
7 Claims. (Cl. 260—473)

This invention relates to novel esters and more particularly to esters of oxydicarboxylic acids and cyclic alcohols containing a ring bridgehead and gem dialkyl groups adjacent to a secondary hydroxy group.

An object of the invention is to provide esters that are new compositions of matter. Another object is to provide a method of preparation of the esters of oxydicarboxylic acids and cyclic alcohols. A further object is to provide esters of oxydicarboxylic acids having good hydrolytic stability, which are useful as plasticizers for poly(vinyl chloride), cellulose ethers, cellulose esters and the like.

Esters of oxydicarboxylic acids and various aliphatic alcohols are known. However, esters of these acids have a serious drawback that limits their utility. Typical esters of the oxydicarboxylic acids are readily hydrolyzed by boiling water. In accordance with the present invention we have now developed novel esters of oxydicarboxylic acids which have excellent hydrolytic stability. We are thus able to benefit from the advantages of using the oxydicarboxylic acids while avoiding the poor hydrolytic stability that has heretofore characterized esters of such acids.

The novel esters are prepared in accordance with the invention by heating an oxydicarboxylic acid with a cyclic alcohol containing a ring bridgehead and gem dialkyl groups adjacent to a secondary hydroxy group at a temperature, for example, of 150 to 250° C., preferably in the presence of a metallic esterification catalyst and a volatile, inert organic solvent that forms an azeotrope with water distilling at the reaction temperature.

The oxydicarboxylic acids employed in accordance with the invention are acids of the type

HOOCCH$_2$—O—R—COOH wherein R is a divalent organic radical such as —CH$_2$—

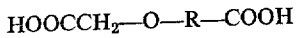

or

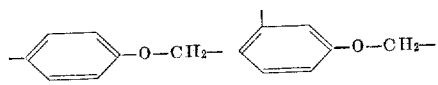

$x$ being an integer from 2 to 4. Examples of such oxydicarboxylic acids include oxydiacetic acid (also called diglycolic acid), tetramethylenedioxydiacetic acid, 1,3-phenylenedioxydiacetic acid, ethylenedioxydiacetic acid, etc. The various oxydicarboxylic acids of this type are known and in most instances are commercially available.

The cyclic alcohols employed in accordance with the invention are of the following types:

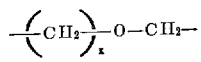

I

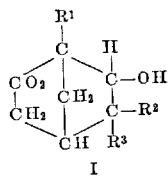

II

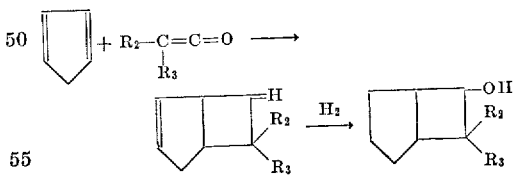

III wherein R$^1$ is hydrogen or a methyl or ethyl radical and R$^2$ and R$^3$ are straight or branched chain alkyl radicals of from 1 to 4 carbon atoms.

The three types of alcohols above have in common the fact that they are bicyclic compounds having a secondary hydroxy group adjacent to one of the bridgehead carbon atoms and also adjacent to another carbon atom having gem dialkyl substituents.

Fenchyl alcohol, an alcohol of type I in which all of the R's are methyl groups, is a well known alcohol and is available commercially. The alcohols of type II can be obtained by reducing unsaturated ketones of the types described in the patent to Kealy, U.S. 2,883,425. Such ketones are of the type:

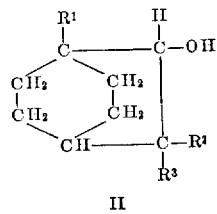

and can be reduced to a type II alcohol by hydrogenation at elevated pressure and temperature in the presence of a hydrogenation catalyst such as nickel.

Alcohols of type III can be obtained by reducing the unsaturated ketones obtained by the addition of dialkylketones to cyclopentadiene, according to the procedure of Staudinger and Meyer, Helv. Chim. Acta, 7, 21 (1924). This preparation can be represented by the following equation:

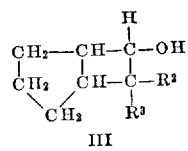

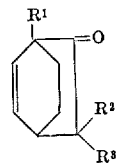

The novel esters are prepared in accordance with the invention by heating the oxydicarboxylic acid, the cyclic alcohol (preferably, in slight excess over two mols per mol of acid) and a small amount of catalyst with a small amount of azeotroping agent. In the preferred procedure of the invention the water evolved in the reaction is collected in a Dean-Stark trap filled with the azeotroping solvent. The volume of the water layer in the trap indicates the degree of completion of the reaction.

The reaction will proceed slowly in the absence of a catalyst but the use of a catalyst is greatly preferred in order to achieve a satisfactory reaction rate. The preferred catalysts are metallic esterification catalysts. Examples of these include titanium alkoxides such as titanium tetraisopropoxide and other alkoxides of titanium prepared from lower alkanols, i.e., aliphatic monohydroxy alcohols of one to about four carbon atoms. Various other organo-titanium compounds are also suitable catalysts as well as titanium oxides and hydroxides. Such catalysts are described in the patents to Caldwell, U.S. 2,727,881 and U.S. 2,720,502; Haslam, U.S. 2,822,348; and British Patents Nos. 852,109, 851,600 and 852,110. The latter two patents also disclose suitable organo-zirconium esterification catalysts. Still other suitable metallic esterification catalysts include various organo-tin compounds, e.g., tin alkoxides, tetraalkyl tin compounds, etc. as disclosed in British Patent No. 810,381 and German Patent No. 1,005,947; lead oxide, sodium aluminate, manganese acetate and the like. As we have indicated, only a small amount of catalyst is required, e.g., from about 0.1 to 2 weight percent of the reaction mixture. Larger amounts of catalyst can be used but no advantage is thereby gained.

While the described metallic esterification catalysts are greatly preferred as catalysts for the method of the invention, acidic esterification catalysts, e.g., sulfuric acid, hydrochloric acid, $BF_3$, etc. can be used. However, if an acidic esterification catalyst is used, dehydration and rearrangement of the cyclic alcohol can take place instead of esterification.

The esterification reaction is preferably carried out in the presence of a volatile, inert, organic liquid that forms an azeotrope with water that distills at the desired reaction temperature in the range of about 150 to 250° C. The preferred reaction temperature is in the range of 180 to 200° C. and the preferred azeotroping agent for this reaction temperature is p-cymene. Other azeotroping agents such as benzene, toluene, cumene, etc. can be used. However, with the lower boiling liquids the reaction temperature is lower and the reaction time is longer.

The esters of our invention are valuable as plasticizers for poly(vinyl chloride), cellulose ethers and cellulose esters such as cellulose acetate propionate and cellulose acetate butyrate, all of which can be processed on hot rolls. The ester is normally employed in an amount of about 25 to 100 parts by weight per 100 parts of resin. Our novel esters are particularly valuable as plasticizers because they are highly resistant to hydrolysis and can be used in molded articles and films under humid conditions that would cause hydrolysis of conventional plasticizers.

The following examples illustrate features of the invention.

*Example 1*

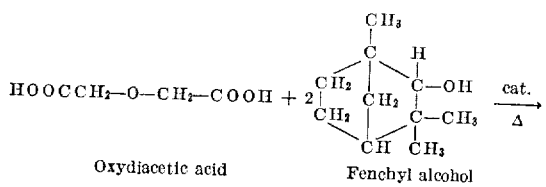

Oxydiacetic acid     Fenchyl alcohol

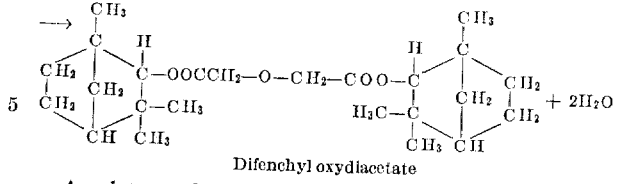

Difenchyl oxydiacetate

A mixture of 33.5 g. (0.25 mol) of oxydiacetic acid, 84.7 g. (0.55 mol) of fenchyl alcohol (type I alcohol wherein $R^1$, $R^2$ and $R^3$=—$CH_3$), 1 g. of titanium tetraisopropoxide and 20 ml. of p-cymene was refluxed for 4 hours. During this time 9 ml. of water collected in a Dean-Stark trap filled with p-cymene and attached to the reaction flask. The product was taken up in benzene and washed with sodium bicarbonate solution and water. After drying with sodium sulfate, the solution was concentrated. The last traces of solvent and excess alcohol were removed at 150° C./1 mm.

The product of Example 1 was subjected to a boiling water hydrolysis test. After refluxing in water for 96 hours, a 1.0 g. sample required 0.272 meq. of alkali to neutralize the acid formed. Therefore, the sample was only 5.5% hydrolyzed.

A mixture of 40 parts of the ester of Example 1 and 100 parts of cellulose acetate butyrate was milled on heated rolls to give a clear, flexible, tough sheet. In a similar manner poly(vinyl chloride) was plasticized, yielding a clear, flexible, tough sheet.

*Example 2*

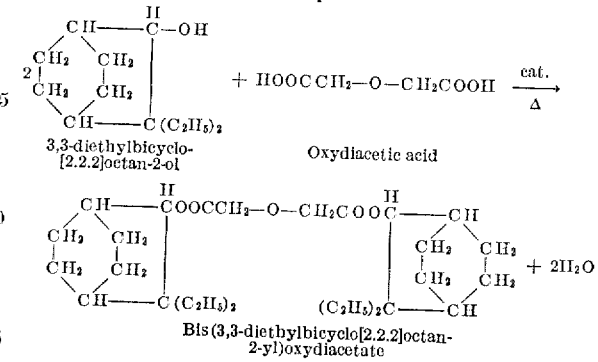

Bis(3,3-diethylbicyclo[2.2.2]octan-2-yl)oxydiacetate 3,3-diethylbicyclo[2.2.2]octan-2-ol (alcohol of type II in which $R^1$ is hydrogen and $R^2$ and $R^3$ are ethyl radicals) was prepared by reducing 3,3-diethylbicyclo[2.2.2]oct-5-en-2-one (described in Example 1 of U.S. 2,883,425) with hydrogen at 1500 p.s.i. and 150° C. over a nickel catalyst (Girdler G-49). The cyclic alcohol was thereafter esterified with oxydiacetic acid according to the procedure of Example 1.

After 96 hours in boiling water, a sample of the ester of Example 2 was only 3.1% hydrolyzed. The ester plasticized cellulose acetate propionate and poly(vinyl chloride) when milled on heated rolls in the manner previously described.

*Example 3*

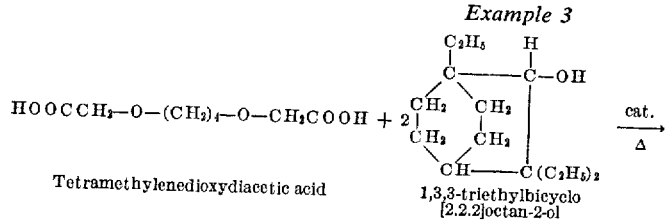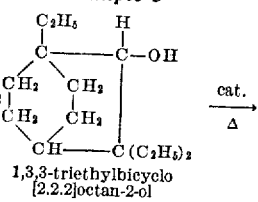

Tetramethylenedioxydiacetic acid     1,3,3-triethylbicyclo[2.2.2]octan-2-ol

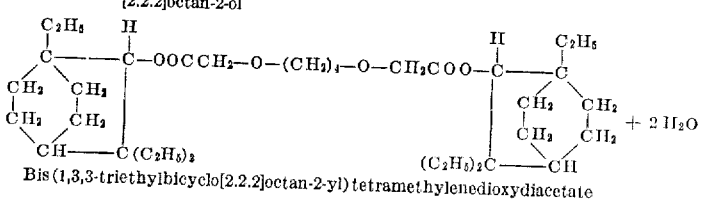

Bis(1,3,3-triethylbicyclo[2.2.2]octan-2-yl)tetramethylenedioxydiacetate 1,3,3-triethylbicyclo[2.2.2]octan-2-ol (a type II alcohol in which all R's are ethyl groups) was prepared by reduction of 1,3,3-triethylbicyclo[2.2.2]oct-5-en-2-one (Example 1 of U.S. 2,883,425) by the method of Example 2. Esterification of tetramethylenedioxydiacetic acid with this cyclic alcohol was carried out as in Example 1.

After 96 hours in boiling water a sample of the ester of Example 3 was only 3% hydrolyzed. This ester plasticized cellulose esters, cellulose ethers and poly(vinyl chloride) when milled on heated rolls as in Example 1.

at 150° C. and 1500 p.s.i. of hydrogen. The hydrogenation product was 7,7-dimethylbicyclo[3.2.0]heptan-6-ol, which is an alcohol of type III in which $R^2$ and $R^3$ are methyl radicals. The alcohol was esterified with oxydiacetic acid by the procedure of Example 1 to obtain the novel ester.

After 96 hours in boiling water a sample of the ester of Example 4 was only 1.5% hydrolyzed. This ester plasticized cellulose esters, cellulose ethers and poly(vinyl chloride) when milled on heated rolls as previously described.

*Example 5*

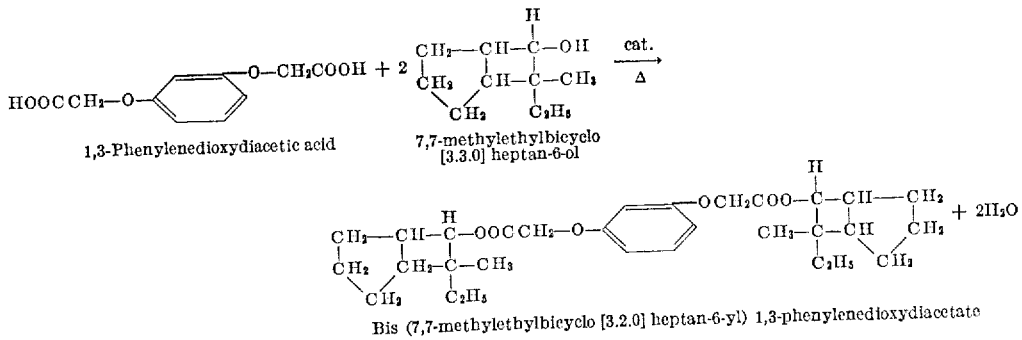

*Example 4*

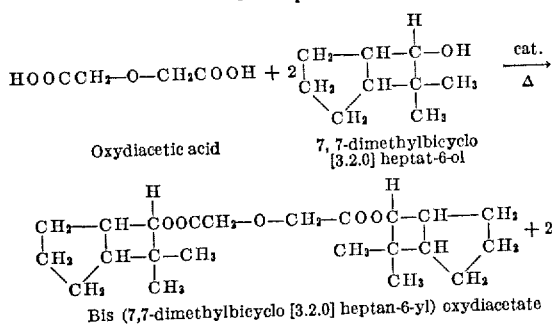

The ester product of this example was prepared by esterifying 7,7-methylethylbicylo[3.2.0]heptan-6-ol (a type III alcohol in which $R^2$ is methyl and $R^3$ is ethyl) with 1,3-phenylenedioxydiacetic acid according to the procedure of Example 1. The cyclic alcohol was obtained by the reaction of methylethylketene with cyclopentadiene followed by hydrogenation of the resulting unsaturated ketone, substantially according to the procedure of Example 4.

In the hydrolysis test of the ester of Example 5, after 96 hours in boiling water a sample of the ester was only 1.3% hydrolyzed. The ester plasticized cellulose esters, cellulose ethers and poly(vinyl chloride) when milled on heated rolls as previously described.

*Example 6*

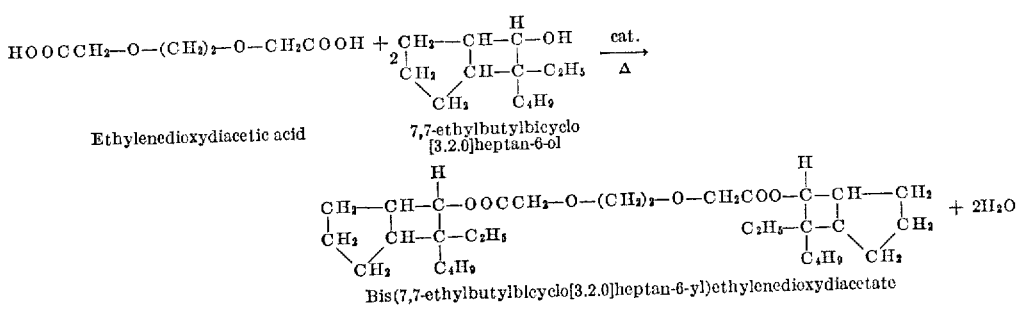

7,7 - dimethylbicyclo[3.2.0]hept-3-en-6-one was prepared by the addition of cyclopentadiene to dimethylketene by a procedure similar to that of Staudinger and Meyer, Helv. Chim. Acta, 7, 21 (1924). Our procedure was to form a solution of 340 g. of cyclopentadiene in 1500 ml. of hexane in a reaction vessel. Dimethylketone vapor was passed into the solution continuously over a period of 7 hours, the reaction mixture being maintained at 6 to 12° C. by an ice bath. Additional portions of cyclopentadiene were added to the reaction vessel during the period of 7 hours, the total amount being 1500 g. including the initial 340 g. The reaction mixture was allowed to stand overnight and then low boilers were distilled off up to 34° C. at 7 mm. Hg and the residue was recovered as the unsaturated ketone product. The latter was thereafter reduced over Girdler G-49 nickel catalyst The ester product of this example was prepared by esterifying 7,7-ethylbutylbicyclo[3.2.0]heptan-6-ol with ethylenedioxyacetic acid according to the procedure of Example 1. The cyclic alcohol was obtained by the reaction of ethylbutylketene with cyclopentadiene followed by hydrogenation of the resulting unsaturated ketone, substantially according to the procedure of Example 4.

In the hydrolysis test of the ester of Example 6, after 96 hours in boiling water a sample of the ester was only 0.6% hydrolyzed.

We have indicated the excellent hydrolytic stability of the esters of oxydicarboxylic acids in accordance with the invention, showing that in hydrolytic tests typical esters of our invention were only 0.6 to 5.5% hydrolyzed after 96 hours in boiling water. In contrast, similar tests of other oxydicarboxylic acids show poor hydrolytic stability.

For instance, the oxydiacetate of 2-norcamphanol was 63% hydrolyzed after 96 hours in boiling water and the oxydiacetate of 2-ethylhexanol was completely hydrolyzed under these conditions.

The invention has been described in considerable detail with particular reference to certain preferred embodiments thereof, but it will be understood that variations and modifications can be effected within the spirit and scope of the invention as described hereinabove, and as defined in the appended claims.

We claim:
1. A diester of
   (a) an oxydicarboxylic acid of the formula

HOOCCH$_2$—O—R—COOH wherein R is a divalent radical of the group consisting of —CH$_2$—

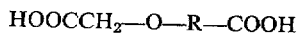

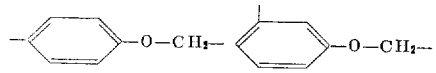

and +CH$_2$+$_x$O—CH$_2$—, wherein $x$ is an integer from 2 to 4, and (b) a bicyclic alcohol selected from the group consisting of

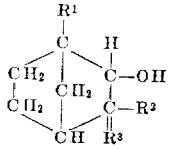
   I

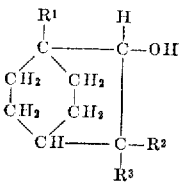
   II and

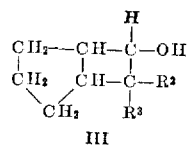
   III wherein R$^1$ is selected from the group consisting of hydrogen, methyl and ethyl, and R$^2$ and R$^3$ are alkyl of 1 to 4 carbon atoms.

2. Difenchyl oxydiacetate.
3. Bis(3,3 - diethylbicyclo[2.2.2]octan - 2 - yl)oxydiacetate.
4. Bis(1,3,3 - triethylbicyclo[2.2.2]octan - 2 - yl)tetramethylenedioxydiacetate.
5. Bis(7,7 - dimethylbicycle[3.2.0]heptan - 6 - yl)oxydiacetate.
6. Bis(7,7 - methylethylbicyclo[3.2.0]heptan - 6 - yl) - 1,3-phenylenedioxydiacetate.
7. Bis(7,7 - ethylbutylbicyclo[3.2.0]heptan - 6-yl)ethylenedioxydiacetate.

References Cited in the file of this patent
UNITED STATES PATENTS
2,720,502    Caldwell _____ Oct. 11, 1955

OTHER REFERENCES

Groggins: Unit Processes in Organic Synthesis (New York, 1952), pages 607–611.

Peterson et al.: Ind. Eng. Chem., vol. 52, pp. 807–8 (1960).

UNITED STATES PATENT OFFICE
CERTIFICATE OF CORRECTION

Patent No. 3,113,963            December 10, 1963

John R. Caldwell et al.

It is hereby certified that error appears in the above numbered patent requiring correction and that the said Letters Patent should read as corrected below.

Column 1, line 20, for "celllulose" read -- cellulose --; lines 65 to 72, for that portion of the formula reading

    read    

column 2, lines 48 to 56, for that portion of the equation reading

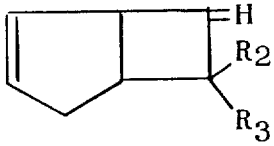    read    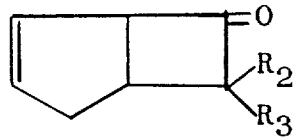

column 5, lines 36 and 37, for "7,7-dimethylbicyclo[3.2.0]heptat-5-ol" read -- 7,7-dimethylbicyclo[3.2.0]heptan-6-ol --; column 6, line 31, for "7,7-methylethylbicylo[3.2.0]heptan-6-ol" read -- 7,7-methylethylbicyclo[3.2.0]heptan-6-ol --; same column, about lines 53 to 59, the formula should appear as shown below instead of as in the patent:

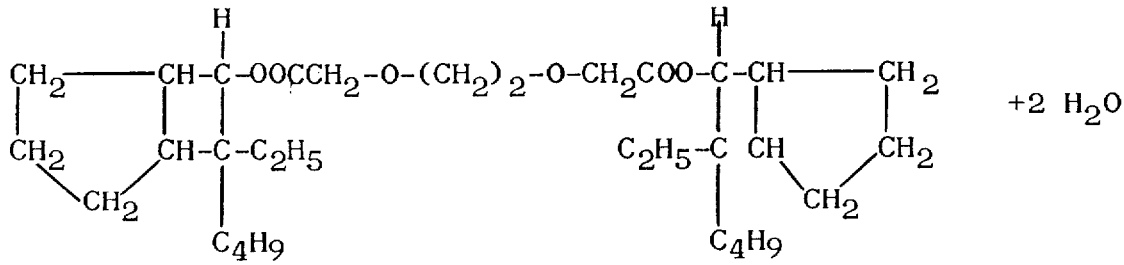

column 7, lines 25 to 30, for that portion of formula 1 reading

    read    

column 8, lines 16 and 17, for "Bis(7,7-dimethylbicycle[3.2.0]-heptan-6-yl)oxydiacetate" read -- Bis(7,7-dimethylbicyclo[3.2.0]-heptan-6-yl)oxydiacetate --.

Signed and sealed this 30th day of June 1964.

(SEAL)
Attest:
ERNEST W. SWIDER
Attesting Officer

EDWARD J. BRENNER
Commissioner of Patents